United States Patent [19]

Anderson

[11] Patent Number: 5,108,141
[45] Date of Patent: Apr. 28, 1992

[54] DEMOUNTABLE RACK FOR TRUCKS WITH CANOPIES

[76] Inventor: Leona F. Anderson, P.O. Box 3754, Federal Way, Wash. 98063

[21] Appl. No.: 435,806

[22] Filed: Nov. 13, 1989

[51] Int. Cl.⁵ .............................................. B60P 3/00
[52] U.S. Cl. ......................................... 296/3; 296/7; 211/182; 211/189; 224/42.45 R
[58] Field of Search ................. 296/3, 43, 7; 211/182, 211/189, 190, 191; 224/42.45 R

[56] References Cited

U.S. PATENT DOCUMENTS

| | | | |
|---|---|---|---|
| 2,720,414 | 10/1955 | Hart | 296/3 X |
| 2,729,196 | 1/1956 | Breitenbach | 296/43 |
| 3,468,430 | 9/1969 | Lawman | 211/182 |
| 4,065,041 | 12/1977 | Stegavig et al. | 296/3 X |
| 4,138,046 | 2/1979 | De Freze | 296/3 X |
| 4,261,470 | 4/1981 | Dolan | 211/191 |
| 4,378,127 | 3/1983 | Rossi | 296/3 |
| 4,509,787 | 4/1985 | Knaack et al. | 296/3 X |
| 4,657,299 | 4/1987 | Mahan | 296/43 X |
| 4,773,575 | 9/1988 | Morrison | 224/42.42 |
| 4,815,787 | 3/1989 | Hale | 296/43 X |
| 4,860,812 | 8/1989 | De Pietro et al. | 211/189 X |

FOREIGN PATENT DOCUMENTS 1433290 2/1966 France .......................... 211/182

Primary Examiner—Margaret A. Focarino
Assistant Examiner—Gary C. Hoge
Attorney, Agent, or Firm—David L. Tingey

[57] ABSTRACT

The present invention comprises a plurality of vertical support members and horizontal members readily assembled and secured on a pick-up truck bed or the like, with or without a canopy on the truck bed, forming a load-supporting rack outside the space typically occupied by a conventional pick-up canopy. Adjustable members provide for height adjustment and for adaptation of the load mounting area to match the dimensions of the load. Rack support members are inserted vertically into base members that are rigidly mounted in typical stake holes characteristically provided on the rim of a truck bed, obviating the need to weld to the truck or to drill bolt holes in the truck. The base apertures for receiving the vertical support members extend from the rim of the truck bed outside the dimension of a typical truck canopy. The rack is also specifically designed for facile assembly and disassembly.

6 Claims, 7 Drawing Sheets

DEMOUNTABLE RACK FOR TRUCKS WITH CANOPIES

FIELD OF THE INVENTION

This invention relates to vehicles and specifically to adjustable load-supporting racks for truck beds, more specifically pick-up truck beds and the like, particularly designed for use with pick-up trucks that use a truck bed canopy.

BACKGROUND OF THE INVENTION

It is known in the art to have load-bearing racks for mounting on pick-up truck beds to extend the utility and load-bearing capacity of the truck. For example, De-Freze in U.S. Pat. No. 4,138,046 describes a rack mounted in the four corners of the truck bed and raised above the truck cabin to facilitate loads with dimensions beyond those of the truck bed, readily assembled and disassembled for compact storage and reasonably quick installation. Dublin in U.S. Pat. No. 4,423,899 describes a rack system permanently mounted in a truck bed at its corners with versatile attachments thereto for various load options. Both patents require support pillars in the corners of the truck bed which precludes use of these racks when the truck is outfitted with a conventional truck bed canopy. Commercial racks are also available; for example, Sears on page 803 of their 1989 catalog shows a ladder rack usable with a truck bed canopy, the rack being supported by a base that bolts onto the inside of the truck bed and extends under the canopy and outside of the bed. All of these racks require defacing of the truck bed by welding or bolting rack support bases to the inside of the truck bed. None of these racks are adjustable in size.

BRIEF DESCRIPTION OF THE DRAWINGS

FIG. 6a is a perspective view of an extension bar with a plurality of apertures along its length.

OBJECTS OF THE INVENTION

It is the object of the present invention to provide a load-supporting rack for use with pick-up trucks or the like that can be mounted and used while a conventional pick-up truck canopy or camper is concurrently mounted on the truck bed.

It is a further object of the present invention to provide a mounting system for the rack such that it can be mounted without welds to or bolt holes in the truck thus preserving the integrity and original appearance of the truck.

It is a further object of the present invention to provide a support rack that can be easily assembled or disassembled in a short time, on the order of a few minutes, by someone of nominal size and strength, such as a young person perhaps of age ten or twelve years.

It is a further object of the present invention to provide adjustable members such that the rack can fit on any conventional truck bed size, with or without any conventional canopy or camper on the truck bed, and can accommodate a variety of load lengths and widths.

SUMMARY OF THE INVENTION

In general, the present invention comprises a basic frame with adjustable support posts and adjustable horizontal members. Horizontal members are also used to add walled containment of the load and to enlarge or reduce the dimensions of the load-mounting area. Frame members are readily assembled or disassembled on a pick-up truck bed or the like, with or without a canopy or camper on the truck bed, forming a load-supporting rack outside the space typically occupied by a conventional pick-up canopy or camper. On assembly, the frame is installed on bases that are removably secured in stake holes characteristically provided on the rim of a truck bed. The base members extend from the rim of the bed outside the dimension of a typical truck canopy or camper. A brace bar can be attached from the truck to the base member as necessary to improve load support.

DESCRIPTION OF THE PREFERRED EMBODIMENTS

Figure 1:
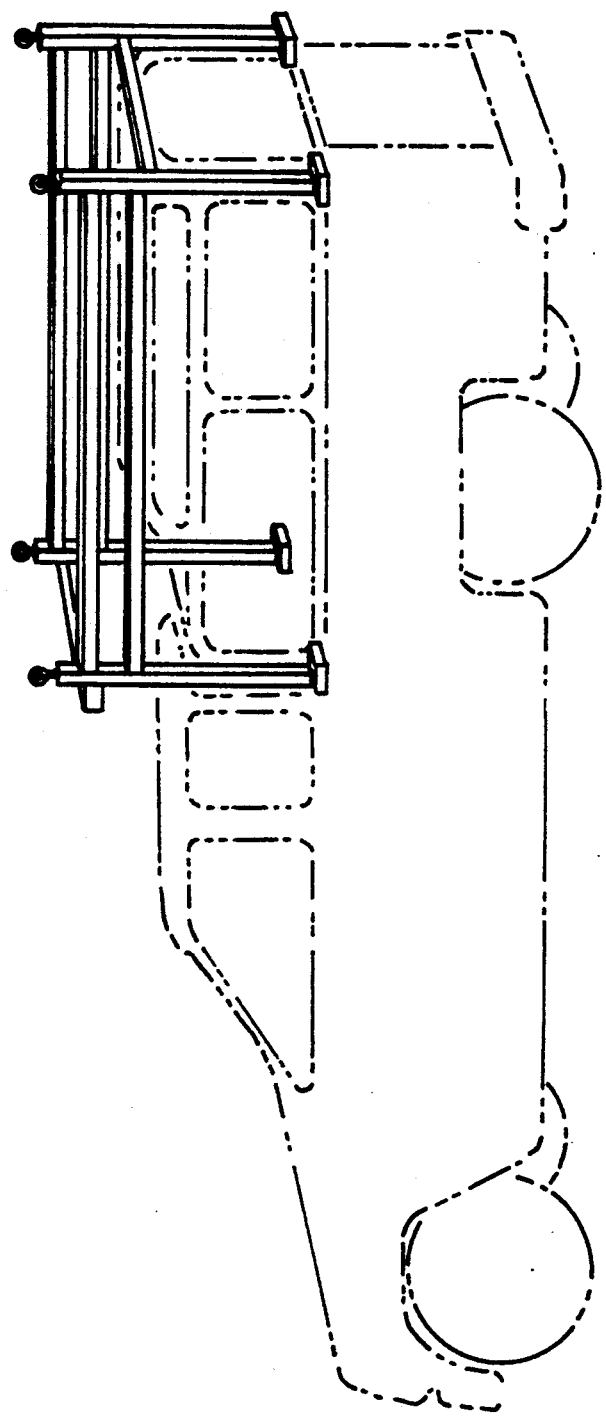
FIG. 1 is a perspective view of a the load-supporting rack installed on a pick-up truck with a canopy mounted in the bed thereof.
Figure 2:
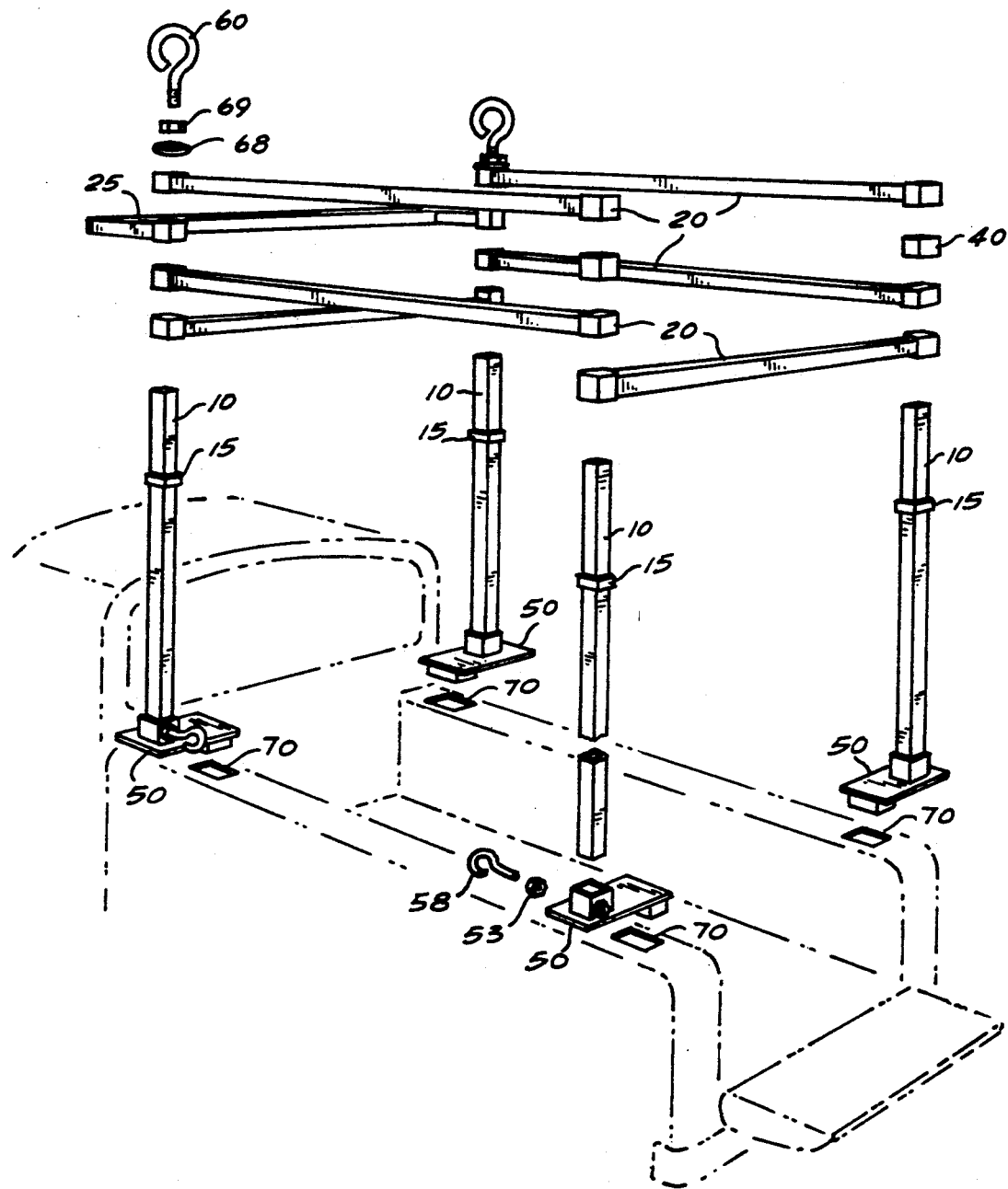
FIG. 2 is an exploded view of the rack.
Figure 3:
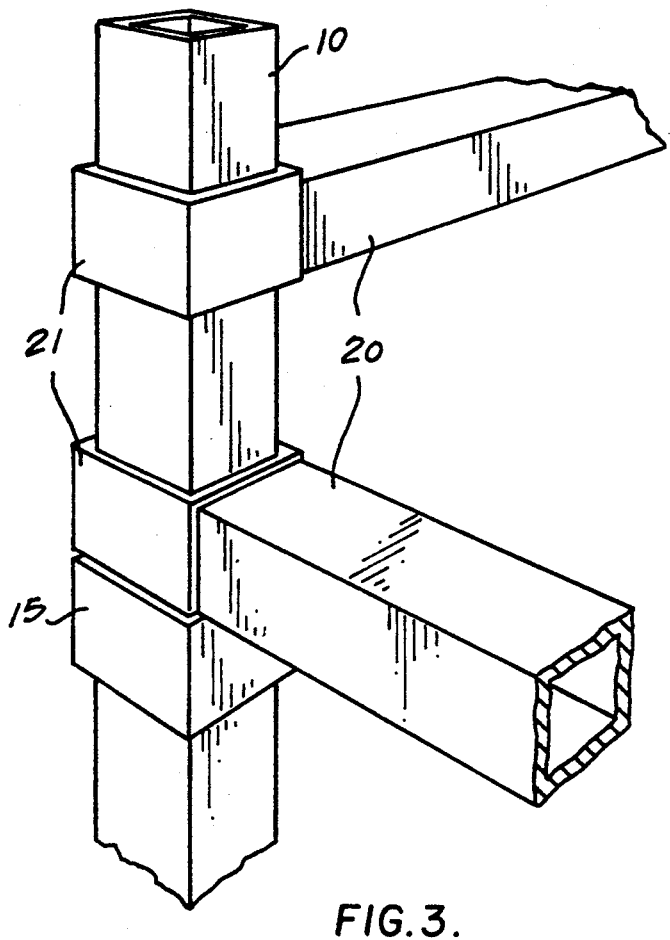
FIG. 3 is a perspective view of the portion of the rack showing the placement of horizontal members over a support member.
Figure 4:
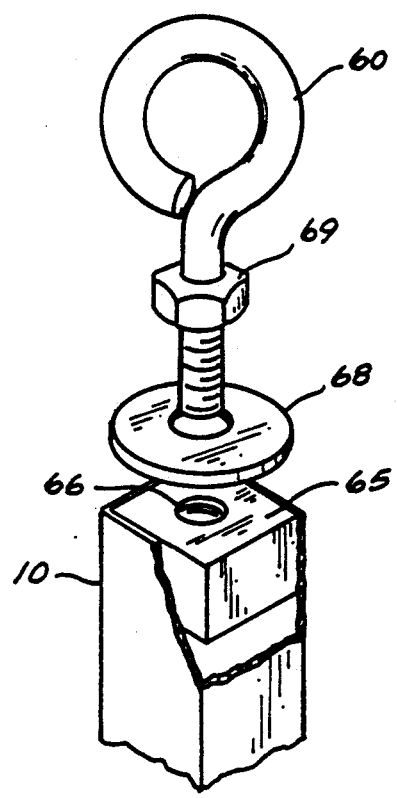
FIG. 4 is a perspective view of a cover plate with eye bolt means having a washer and lock nut for securing horizontal members to support members.

Referring to FIG. 2 and FIG. 3, in its usual configuration, the present invention for forming a load-supporting rack outside the space typically occupied by a conventional pick-up canopy or camper comprises (1) a basic frame comprised of four primary support posts 10 and four horizontal members 20 which may be constructed from rectangular tubing, with means to removably interconnect the frame members; (2) additional horizontal members 20 for providing a load-mounting area dimensionally different from that area whose perimeter is defined by the frame support posts and for providing a walled boundary to the load by stacking the horizontal members; (3) spacers to facilitate stacking; and (4) base members for securing the frame to a pick-up truck bed or the like, with or without a canopy or camper also on the truck bed. Adjustable horizontal members accommodate truck stake holes in any position on the bed rim and enable the rack to carry loads of a variety of widths and lengths. Adjustable primary support posts position horizontal members, and therefore a rack load, at any practical height above the bed. Horizontal members can be shaped in any way convenient to the application, such as straight horizontal members 20 and U-shaped horizontal member 25, as shown in FIG. 2.

Figure 7:
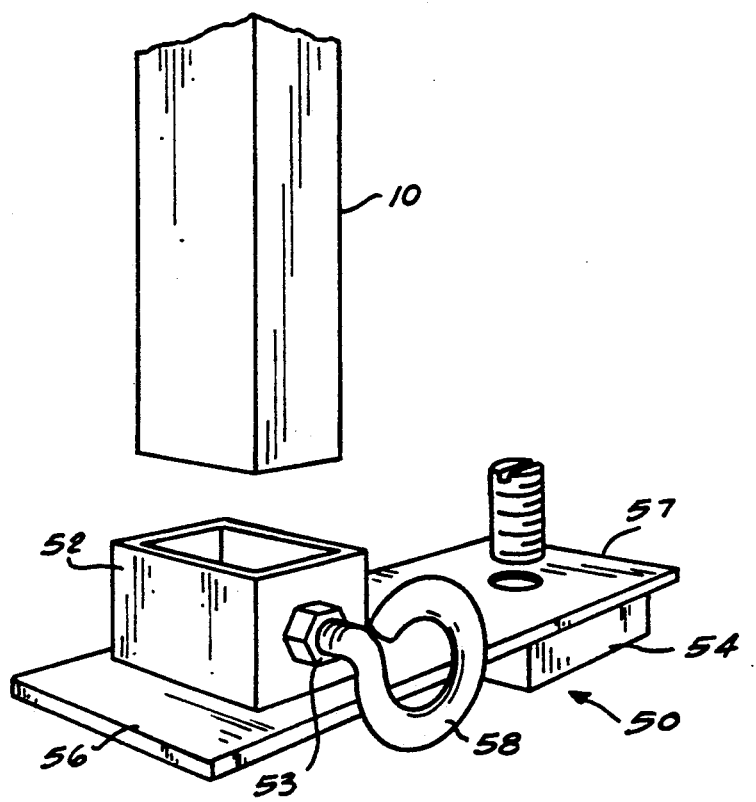
FIG. 7 is a base with a rectangular sleeve.
Figure 8:
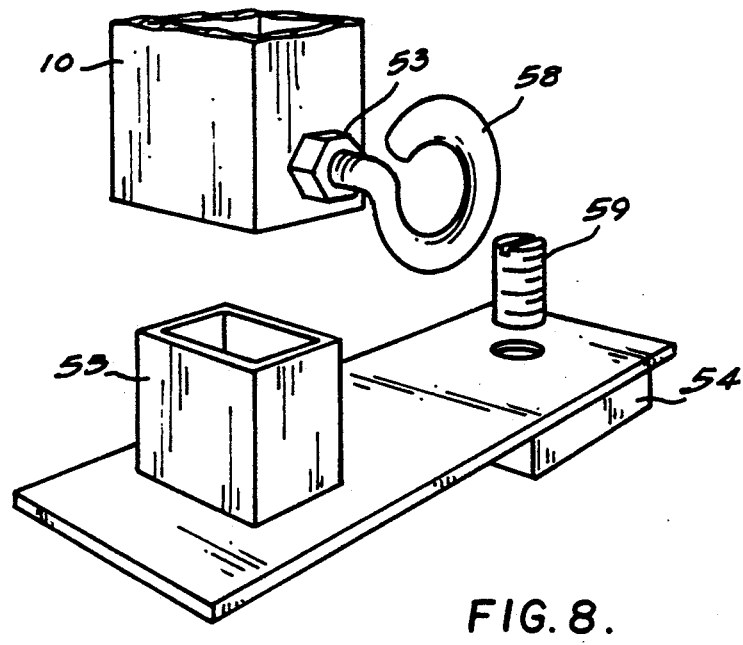
FIG. 8 is an alternate base with a protruding block.
Figure 9:
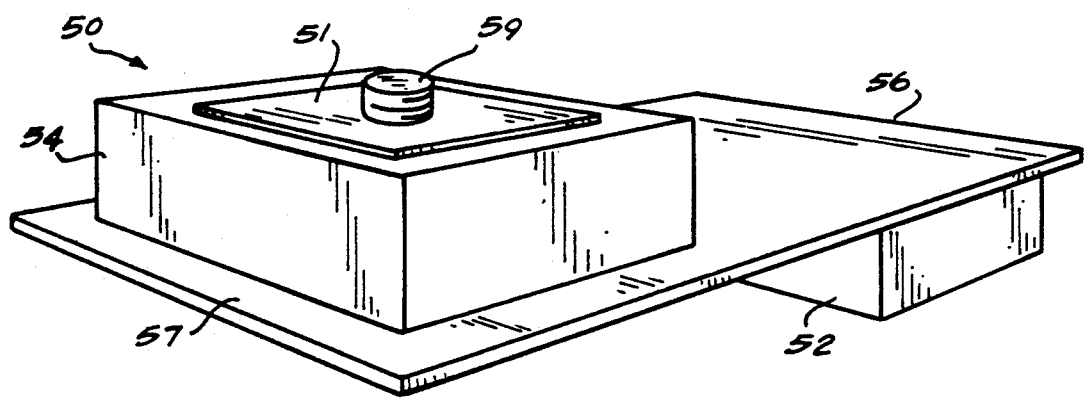
FIG. 9 is a bottom perspective view of a base showing a mounting block.

Referring to FIG. 2 and FIG. 7, base 50 has an upper side and a lower side and comprises a frame attachment means shown, for example, as an upright elongated rectangular sleeve 52, on its upper side near its first end 56 into which the lower end of a vertically mounted frame support post is inserted, which frame attachment means includes a securing means which may be a bolt 58, for example, a conventional eye bolt, which thereby also provides a point for load tie down, which securing means may also include a lock nut 53 on the bolt to better secure the assembly. In an alternate embodiment of the frame attachment means, as shown in FIG. 8, where the support post is made of rectangular tubing, the frame attachment means may be a protruding frame-attachment block 55 attached to the base upper side at its first end sized such that a primary support post fits over the block, the primary support member removably secured to the protruding block, for example, with a bolt and a lock nut in a threaded hole in the end of a protruding support post. Bases normally remain in place in the several stake holes in the truck rim when a canopy is mounted on the truck.

Base 50 also comprises a mounting block 54 affixed to its lower side and near its second end 57 longitudinally opposite its first end. The mounting block 54, preferably made of hard rubber or similar material, is dimensioned to fit into a stake hole 70 on the truck bed rim. The block is secured into the stake hole by vertically compressing the block causing it to extend horizontally firmly against the stack hole. Vertical compression is achieved by tightening a screw 59 which extends down through a hole in the block, nominally at its center, and into a threaded hole in a rigid plate 51 provided at the bottom of the block, thereby lifting the plate upward against the block.

When the rack is installed on the truck, block 54 is secured into a stake hole on the rim of the truck bed with the first end 56 of the base 50 extending away from the truck bed a distance such that the frame attachment means 52 is external to the space typically occupied by a conventional truck bed canopy or camper. A brace extending from the outer dimension of the base to the truck is employed when needed to improve load support.

For the basic frame, frame support posts 10 are each removably attached vertically to a base 50. A collar 15 on each primary support post, adjustably affixed in similar longitudinal dimension on each support member 10, supports horizontal members. The collar adjustment means may be of any suitably design; for example, on each support member the collar may rest on a bar inserted through holes in the support member and secured at the chosen height adjustment. In the alternative, a collar may be permanently affixed onto support members for applications with an invariable height.

Primary support posts 10 are secured to horizontal members 20, each having support apertures 21 at each of their ends. Upper ends of each support member pass through a support aperture 21 of a horizontal member 20. All support apertures of horizontal members and support posts are dimensioned so that any horizontal member aperture could be mounted over any support post. A front horizontal member connects two frontmost support members; a rear horizontal member connects two rear-most support members; and two side horizontal members connect two left-most support members and two right-most support members, respectively. Multiple horizontal members can be stacked to the end of support posts to provide for improved walled containment of an intended load.

Figure 5:
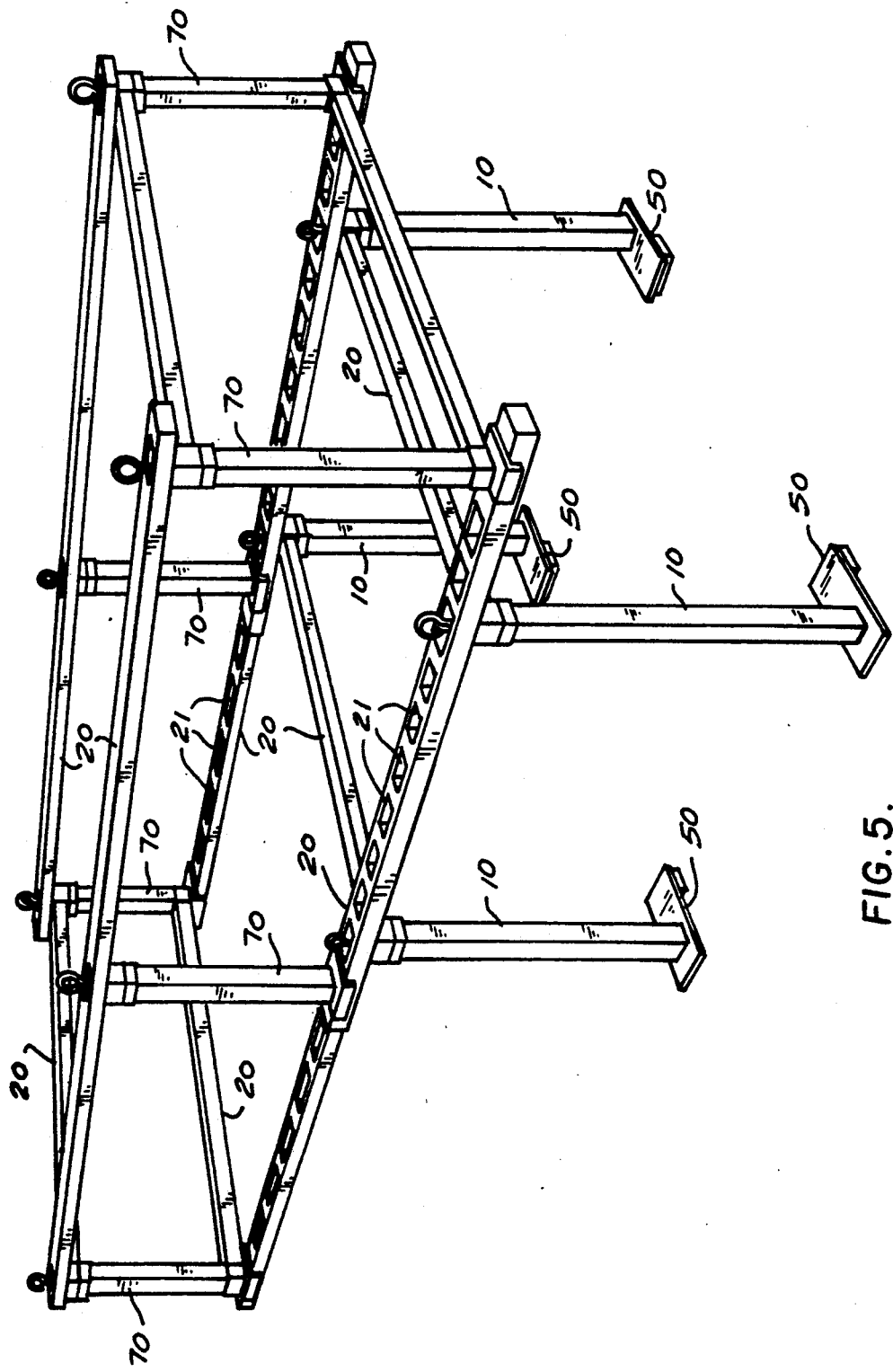
FIG. 5 is a perspective view of an extended rack.
Figure 6:
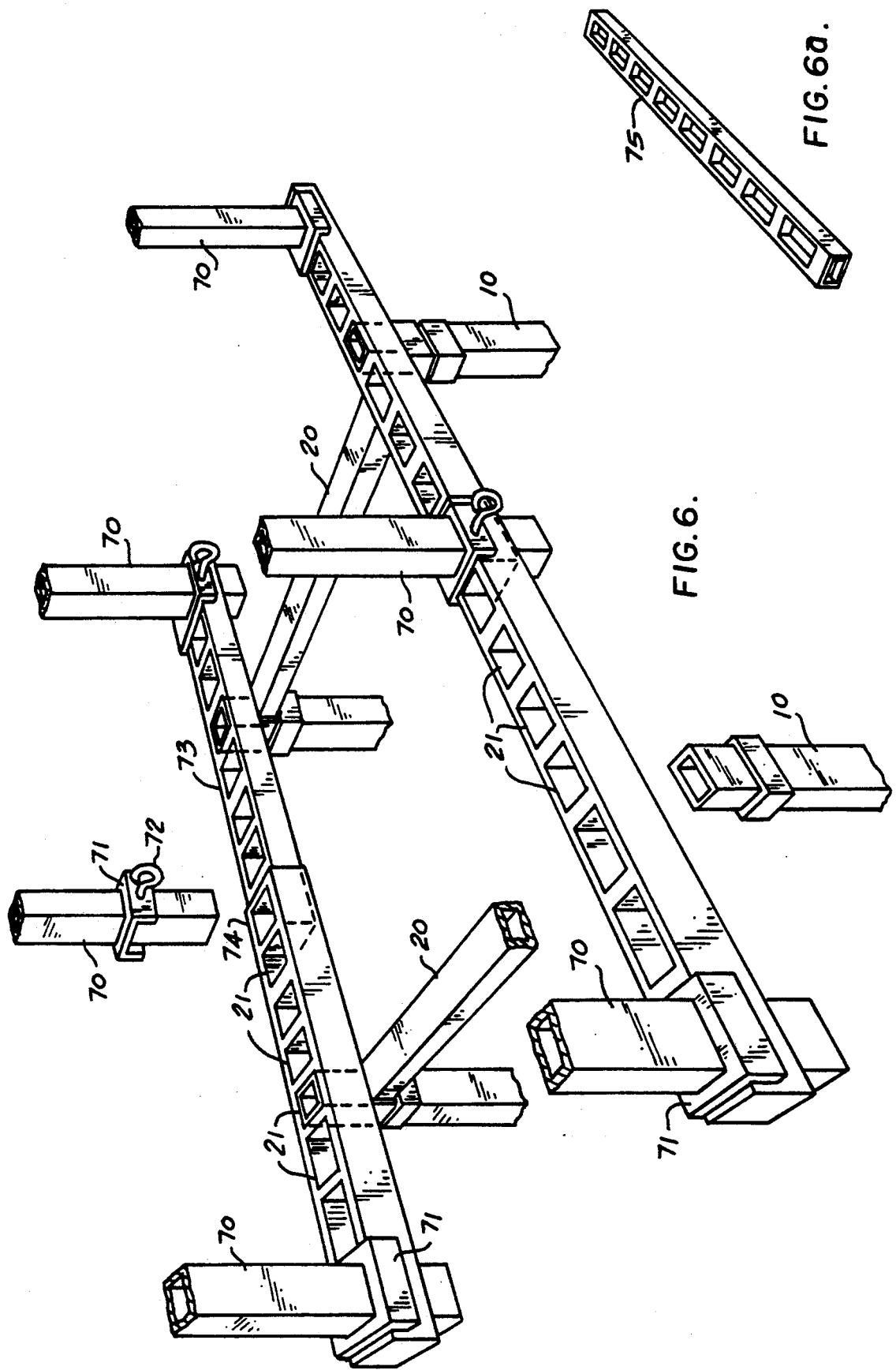
FIG. 6 is an exploded view of adjustable members secured and joined with secondary support posts.

As shown in FIG. 5 and FIG. 6, horizontal members may extend beyond the frame support posts, in which case a support aperture 21 is located at each end and also intermediate the horizontal members to receive the support posts. Secondary support posts 70 with a secondary support collar 71 intermediate their lengths are removably secured into support apertures at each end of the horizontal members. A plurality of support apertures 21 may be located along the length of a horizontal member, and secondary support posts 70 may be placed therein as desired, to include posts at least at each intersection of two horizontal members. Means to secure a secondary support post 70 firmly against a horizontal member may be a lip extending down from two sides of the collar and over the horizontal member with a threaded hole in the lip through which a bolt, preferably an eye bolt 72, is tightly screwed. Horizontal members 20 are mounted on the secondary support posts 70 to complete a load mounting area larger than the perimeter defined by the primary support posts.

Horizontal members are adjustable to accommodate changes in load dimensions and differences in truck bed stake hole positions. For example, the horizontal member may comprise two elements 73 and 74 of rectangular tubing, one fitted slidably into the other, each having a plurality of support apertures 21 along its length for receiving support members. After a desired length is approximated by sliding one member into another, nearest support apertures in each element are aligned and at least one secondary support post 70 or primary support post 10 is inserted through the aligned support apertures. An extension bar 75 also with a plurality of apertures 21 along its length alternately can separate and extend horizontal member elements 73 and 74, with an extension bar end slidably inserted into them (or over them), respectively, and secured with a rack post or support member inserted through aligned apertures 21 between the extension bar 75 and each element 73 and 74, respectively. In the alternative, a single horizontal member of fixed length may be employed for a constant length application.

Horizontal members are secured in place over primary and secondary support posts by a bolt 60 which is screwed into a threaded hole 66 in a cover plate 65 permanently affixed to the end of the support post with the hole size and thread matching the bolt 60. In practice, the cover plate may be a nut welded into the end of the support post. The head of the bolt 60 is sized to cover the end of a support post and a horizontal member at its aperture 21, or in the alternative, a washer 68 or other means is used in conjunction with the bolt 60 to cover the end. A lock nut 69 may also be employed in conjunction with the bolt 60 to better secure the assembly. The bolt 60 may also be a conventional eye bolt as depicted in the figure, in which case the eye of the bolt can also serve as a tie down point for further securing the load with ropes and the like. One or more spacers 40 with support apertures 21 may be used in lieu of a horizontal member to derive a preferred stacking arrangement or to fill any gap in the distance from the collar 15 to the top of the support member where the bolt 60 secures the assembly. The entire assembly process typically takes only a few minutes and can be performed by a small person.

What is claimed is:

1. In a load-support rack easily and quickly assembled for use on a pick-up truck bed with stake receiving holes while a canopy is also mounted on the bed of the truck comprising a basic frame and means for removably attaching the basic frame to the truck bed without displacing a truck canopy or camper, the basic frame comprising four horizontal members interconnected and defining a primary load-carrying area supported by four primary support posts separated in a spaced-apart relationship, defining a post separation distance, and extending vertically from a base attached to a truck bed to the primary horizontal members a height above the truck bed greater than that of a mounted truck camper, the improvement comprising means for extending the size of the load-carrying area comprising extended horizontal members, having lengths greater than the post separation distance, and having a plurality of support apertures along their lengths and at their ends such that, on assembly, a support aperture is located at each intersection of a horizontal member with a primary support post and also at each intersection of two horizontal members, a plurality of secondary support posts each with a collar permanently affixed intermediate its length and having a securing means which affixes each secondary support post to a horizontal member, a secondary support post first end inserted at each intersection of horizontal members into a support aperture of a first horizontal member until supported by the post collar, a support aperture of a second horizontal member being removably secured over a secondary support post second end and resting on its collar.

2. A load-support rack as claimed in claim 1, the further improvement including adjustment means for adjusting horizontal frame members such that a horizontal frame member can be extended whereby the functional size of the rack can be easily adjusted to accommodate a variety of load sizes.

3. A load-support rack as claimed in claim 2 in which the adjustment means for adjusting horizontal frame members comprises a first horizontal element fitted slidably into a second horizontal element, each first and second element having a plurality of support apertures along its length, selected support apertures of each element being aligned at a desired combined length, with a first end of a primary or secondary support post inserted therethrough and secured.

4. A load-support rack as claimed in claim 3 providing for further extended adjustment, the improvement comprising a third element having a plurality of support apertures, each end thereof being inserted slidably into each of the first and second elements, respectively, secured by a first end of a primary or secondary support post being inserted through aligned support apertures of the members.

5. The rack as claimed in claim 1 where multiple horizontal members are stacked on support members to provide improved walled containment of loads further comprising a plurality of spacers each having a support aperture placed of support posts in lieu of a horizontal member to derive a preferred stacking arrangement.

6. The rack as claimed in claim 1 further comprising a collar adjustably secured at a selectable position along each primary support post for supporting horizontal members placed thereon whereby the load-carrying area is adjustable in height above the truck bed.

* * * * *